United States Patent [19]

Irani et al.

[11] 3,886,528

[45] May 27, 1975

[54] PROGRAMMABLE CONTROL APPARATUS

[75] Inventors: Jamshed Irani, Oberkulm; Eduard End, Aarau, both of Switzerland

[73] Assignee: Sprecher & Schuh AG, Aarau, Switzerland

[22] Filed: Feb. 25, 1974

[21] Appl. No.: 445,638

[30] Foreign Application Priority Data

Feb. 27, 1973 Switzerland ........................ 2849/73

[52] U.S. Cl. ........................ 340/173 R; 340/172.5

[51] Int. Cl. ........................ G11c 13/00

[58] Field of Search ........................ 340/173 R, 172.5

[56] References Cited

UNITED STATES PATENTS

| | | | |
|---|---|---|---|
| 3,475,733 | 10/1969 | Gaines | 340/173 AM |
| 3,742,460 | 6/1973 | Englund | 340/172.5 |

*Primary Examiner*—Terrell W. Fears

*Attorney, Agent, or Firm*—Waters, Schwartz & Nissen

[57] ABSTRACT

Programmable control apparatus provided with a plurality of addressed program lines each having a respective read-out storage for the preserved storage at addressed storage positions or locations of coded command and address information characterizing the individual steps of a flow diagram. A respective stepping or indexing storage delivers the address signals for the storage positions of the read-out storage. The addressed program blocks and the stepping storages are interconnected through a common program address line, a common command line and a common stepping or indexing-control signal line. Further, a central station or device contains a clock generator which generates in successive periods a respective predetermined number of time-displaced clock signals which do not intersect one another, a cyclically through-counting program address counter with which there is connected the program address line, a command register with which there is connected the command line, a control logic for the evaluation of decoded command signals and connected by a command-decoding circuit with the command register, and at which control logic there are connected the input stages by means of a common input-information line and the output stages by means of a common output-information line, and an address storage (anti-clockwise storage) with random access for a command-dependent storage of program block addresses. Further, for each program block there is provided at least one timing circuit, and during each period of clock signals the program address counter is indexed further by one by means of the first clock signal, by means of the second clock signal the command register is read-in, by means of at least one terminal clock signal according to the momentary program block addresses provided for the relevant program block there is controlled at least one timing circuit, and by means of the remaining clock signals there is controlled the period of the control logic as a function of the read-in command signals, so that during each counting cycle of a program address counter all program blocks are sampled and during each period there is carried out a command.

16 Claims, 7 Drawing Figures

PROGRAMMABLE CONTROL APPARATUS

BACKGROUND OF THE INVENTION

The present invention relates to a new and improved construction of programmable control apparatus for controlling switching devices according to a number of flow diagrams which are dependent and/or independent of one another.

There are known, for instance, switching installations wherein addressed input stations for the delivery of binary information signals characterizing switching states and addressed output stages controlled by means of the information signals are connected with a common information line and with a common address line and controlled from a central station or device equipped with a clock generator. The central station or device delivers a cyclic sequence of signals for a multiplicity of addresses by means of which the addressed input stages and output stages are activated. The input and output stages are controlled via the central station or device.

The fixed wiring of the central device with the control cable leading therefrom and containing the address lines, information- and control lines, and at which control cable there can be connected the input and output stages constructed, for instance, in the form of plug-in inserts, renders possible economical mass production of such installations with simple bearing supports and optimum accommodation of the installation at the momentarily encountered operating conditions. Of particular advantage is the fact that for connecting the momentarily required input stages and output stages there are not necessary any complicated wiring layouts.

The automatic optimization of a complicated control system is normally realized by means of a computer. The expediture necessary for this purpose is considerable, and in a great number of instances not justified, for instance for controls used in the machine industry, in process- and conveying arts, where there are only necessary a small number of mathematical optimization operations. Even for really complicated control installations, the flow diagrams essentially encompass only the following basic functions: sampling of the input conditions, logical decisions, switching-in and switching-off adjustment elements and time-delays.

SUMMARY OF THE INVENTION

It is a primary object of the present invention to provide an improved construction of programmable control device capable of carrying out complex control problems encompassing, for instance, several thousand steps and wherein there can be controlled numerous interdependent and independent operations which, in a series mode of operation, renders possible direct transformation of flow diagram programs with ease in learning, and furthermore wherein the advantages of economical mass production and the possibility of easily carrying out the changes and amplifications of the system heretofore discussed in conjunction with prior known switching installations are also present with the development of this invention.

Another object of the present invention is directed to the provision of an improved construction of programmable control device which is relatively simple in construction and design, easy to use, highly reliable in operation, and not readily subject to breakdown or malfunction.

Now in order to implement these and still further objects of the invention, which will become more readily apparent as the description proceeds, and starting from a control apparatus equipped with a plurality of addressed input stages for the delivery of binary input information signals characteristic of the switching states of devices connected therewith and a plurality of addressed output stages equipped with connections for the switching devices for receiving output information signals characteristic of the switching commands and a central station or device containing a clock generator and with which central station or device there are connected the input stages and output stages by means of a common address line, the programmable control apparatus of this development is manifested by the features that there are provided a plurality of addressed program lines each having a respective read-out storage for the preserved storage at addressed storage positions or locations of the coded command- and address information characterizing the individual steps of a flow diagram.

There is further provided a respective stepping or indexing storage which delivers the address signals for the storage positions of the read-out storage. The addressed program blocks and the stepping storages are interconnected through the agency of a common program address line, a common command line and a common stepping or indexing-control signal line. Further, the central station or device contains a clock generator which generates in successive periods a respective predetermined number of time-displaced clock signals which do not intersect one another, a cyclically through-counting program address counter with which there is connected the program address line, a command register with which there is connected the command line, a control logic for the evaluation of decoded command signals and connected by a command-decoding circuit with the command register, and at which control logic there are connected the input stages by means of a common input-information line and the output stages by means of a common output-information line, and an address storage (anticlockwise storage) with random access for a command-dependent storage of program block addresses.

Further, for each program block there is provided at least one timing circuit, and during each period of clock signals the program address counter is further indexed by one by means of the first clock signal, by means of the second clock signal the command register is read-in, by means of at least one terminal clock signal according to the momentary program block addresses provided for the relevant program block there is controlled at least one timing circuit, and by means of the remaining clock signals there is controlled the period of the control logic as a function of the read-in command signals, so that during each counting cycle of a program address counter all program blocks are sampled and during each period there is carried out a command.

By means of, for instance, 16 program blocks (4-bit-program addresses) each equipped with a repective read-out storage for 256 command words (8-bit command addresses), it is already possible to cover 4096 program steps. The total number of program steps can be subdivided into interdependent and/or independent partial programs in accordance with the number of program blocks, wherein the partial programs are continuously effective since sampling of the program blocks occurs very quickly. By means of an address storage a partial program also can be used as a subroutine, and in each partial program random jumps or steps are possible since the stepping storages of the program blocks are set by the control logic. The central station or device is advantageously fixedly wired and common lines leading therefrom can be provided at which there can be connected the input stages, the output stages and the program blocks without their being required for this purpose a wiring plan or layout.

The input stages and output stages are advantageously grouped together into a number of modules or structural units which, just as was the case with the program blocks, are identical to one another, so that, also as is the case for the central device, they too can be mass-produced economically. The central device can contain an internal operating-drive logic and an internal control-drive logic. For these logics there are arranged at an external operating- and control panel manually operable switches and control signal lamps, wherein especially by means of a resetting signal which can be triggered by a key or button, it is possible through the agency of the operating-drive logic to block the clock generator of the central device and to reset to null the program address counter, the command register, the address storage and the timing circuits as well as the stepping storages of the program blocks.

Further, for the adjustment or setting of different operating modes of the control apparatus there can be provided an operating modeselector switch, wherein with one switching position of the switch for automatic operation the clock generator is switched into its active state via the operating-drive logic by means of a "running"-signal which can be triggered by means of a further key for carrying out the course of the program for the central unit. When the selector switch is in its switching position for test operation for controlling the commands stored at the program blocks, the command line is connected by means of the control-drive logic with signal lamps and via the operating-drive logic the program address counter is always further indexed by one by means of a program address-indexing or switching signal which can be triggered by a key and the stepping storage of a program block characterizing the program addresses likewise being further indexed by one step by means of a command address-indexing or switching signal which can be triggered by a further key.

For the control or driving of the program blocks the programmed address line for the input of the program block-address signals can be connected via a controlled selector circuit with, the program address counter for a command-independent addressing of the program blocks by address signals of a program address counter, with the command register for the command-dependent addressing of the program blocks by command signals, and for the selective addressing of the program blocks with a transmitter circuit of the operating-drive logic and which transmitter circuit can be activated by a manual switch for the delivery of address signals.

It is advantageous to also provide for the control apparatus a semi-automatic operation wherein with a further switching position of the operating mode-selector switch the program address counter is blocked via the operating-drive logic and a program block is addressed by means of the program address-manual switch and by means of a "start"-signal for the selected program block, which start signal is triggered by a key, there is started the automatic course or running of the program. As already mentioned, there are preferably grouped together a number of inputs and outputs into a respective input and output unit or module, each unit or module containing a storage with a number of storage locations or positions corresponding to the inputs and outputs respectively of the module, and each module itself as well as the storage places of the module are addressed by an address system.

For the control of the inputs, the input modules can contain a respective gate circuit controlled by a control address-decoding circuit, by means of which gate circuit the positions of a storage are coupled with a multiconductor control input-information line; the address-decoding circuit can be connected by means of an address line common to all inputs with the control-drive logic, which can contain address-transmitter circuits and switching means which can be operated by manual switches for generating control-address signals, and by means of which the control input-information line for indicating the input information appearing at the inputs of the input unit or module selected by a control address is connected with signal lamps.

The output units or modules can be constructed in the same manner, i.e., can contain an address-decoding circuit connected with the common control-address line and a gate circuit controlled thereby, by means of which the storage positions are connected with a common control-output information line which, in turn, is connected via switching means at signal lamps for the indication of the output information appearing at the outputs. Of course, the details of the construction and design, especially the control logic for the evaluation of the command signals, are governed by the momentarily provided commands.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
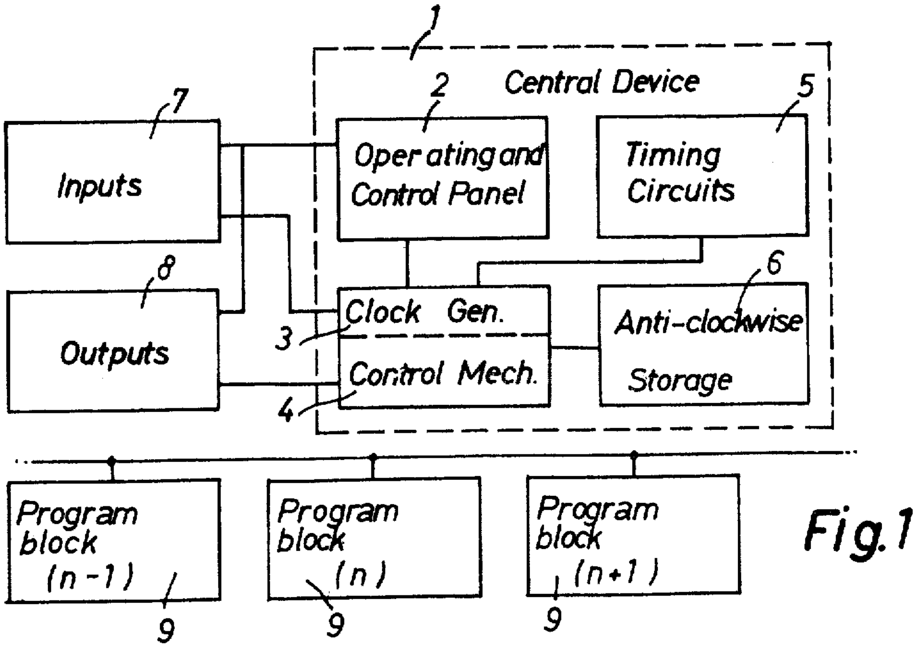
FIG. 1 schematically illustrates the basic construction of a prorammable control apparatus according to the invention in the form of a block circuit diagram.

Describing now the drawings, the basic construction of a programmable control apparatus according to the invention has been shown in FIG. 1 in the form of a block circuit diagram. A central unit or device 1 encompasses as an external part or component an operating and control panel or front 2 with different switches and keys for operating purposes as well as, for instance, signal lamps serving as indicators, and as the internal part or component a clock generator 3 which during successive periods delivers for instance each time eight time-displaced control signals which do not overlap or intersect one another, and further includes a control mechanism 4, timing circuits 5 and an address storage (anti-clockwise storage) 6.

Connected with the central device 1, also sometimes called central station, are addressed input stages 7, addressed output stages 8 and addressed program blocks 9. The individual units are electrically coupled with one another by address- and information lines. Binary signals are processed in accordance with the switching states ON and OFF. The input stages 7 and the output stages 8 are provided with connection terminals for the connection of switching- and reporting devices, the input stages 7 obtaining from the devices information signals regarding the momentary switching state and the output stages 8 delivering to the devices control signals for the switching-on and switching-off thereof.

The central unit or station 1 is designed for a predetermined number of addressed program blocks, for instance 16 program blocks with 4-bit-addresses. At a common connection cable there can be coupled a random number of program blocks up to the maximum number, so that the control apparatus can be easily accommodated to the momentarily prevailing requirements. As will be described more fully hereinafter, a program block contains at addressed storage locations or positions command words formed of binary characters for the individual steps of a flow diagram.

Due to the successive periodic control signals the program blocks are sampled in cyclic sequence via the program block-addresses and for each period there is only carried out a single command. Since the sampling of the program blocks occurs very quickly, from the outside a program appears to be continuously effective. The timing circuits 5 render it possible to program almost all times which arise. At the anti-clockwise storage 6 there can be temporarily stored a program block address. With this anti-clockwise storage it is possible to use a partial program as a subroutine as will be more fully explained hereinafter.

Figure 2:
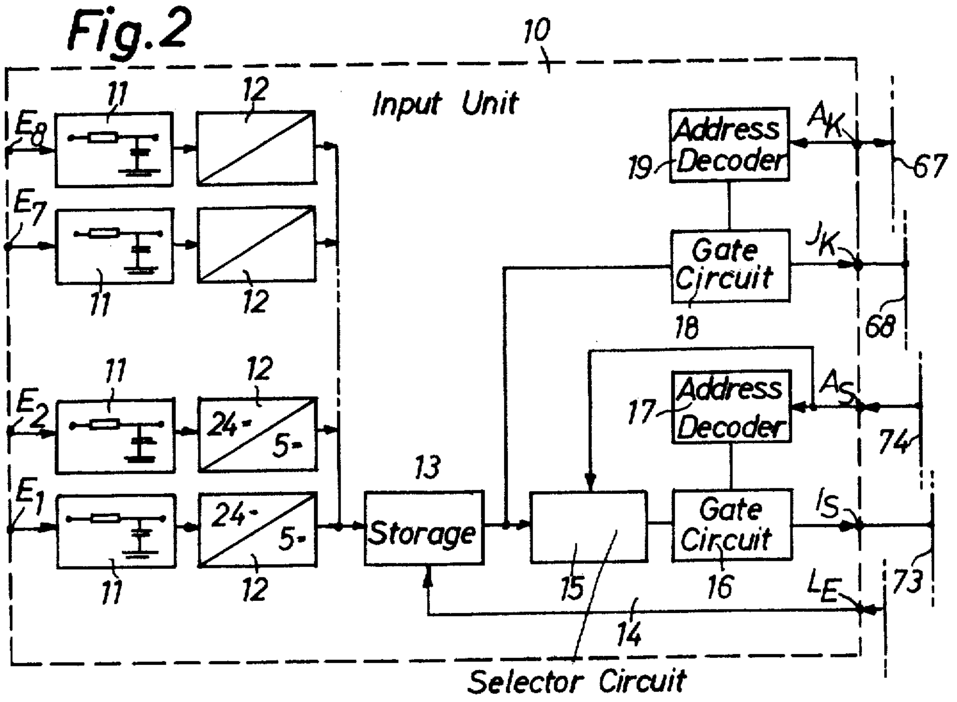
FIG. 2 is a block circuit diagram of an input unit or module.

The input stages are provided with input units, for instance cards, plug-in units or equivalent structure. FIG. 2 illustrates a block circuit diagram of one such input 10. The input unit 10 is equipped, for instance, with eight separate inputs E (designated in particular as $E_1$, $E_2 \ldots E_7$, $E_8$) which are connected via a respective low-pass filter 11 and a contact transducer 12 with an eight-place or position storage 13. The low-pass filter 11 functions to suppress rapid signal fluctuations which might lead to disturbances. By means of the low-pass filter 11 there is also rendered ineffectual the disturbances caused due to chattering of the switch contacts at the switching devices connected with the input. By means of the contact transducer 12 the high input voltage is stepped-down to a lower voltage value which is permissible for the logic modules or blocks.

The input information is read-in to the storage 13 by means of a reading signal appearing at the reading line or read-in conductor 14. The reading-in of the input information at the storage 13 occurs between two successive program sampling steps, so that all conditions remain stable during the performance of a command, with the result that there is considerably increased the security of the control apparatus against malfunctions or disturbances. For the selection of an input the input unit contains an address logic. If the control apparatus is designed, for instance, for a total of 32 input units each with eight inputs, then for the selection of the inputs there are required 8-bit-address words, for which there is provided a common multiconductor input-address line.

At each input unit 10 there is connected at the eight outputs of storage 13 a selector circuit 15 (multiplexer) controlled by three bits of the address word and for this purpose is connected with a terminal $A_S$ of the input unit at which there can be connected the input address line of the control apparatus. At the output side the selector circuit 15 is electrically coupled via a gate circuit 16 with a terminal $I_S$ of the input unit, at which there is connected the common input- (control)-information line of the control apparatus. The selection of the individual input units 10 occurs by means of the remaining five bits of the address word.

To this end each input unit 10 contains an address-decoder 17 which is connected via the terminal $A_S$ with the input-address line of the control apparatus and which, upon occurrence of the address destined for the relevant input unit, drives or controls the gate circuit 16. At the control panel or front 2 of the control apparatus there are provided eight signal or indicator lamps for the control of the inputs E of the individual input units, these signal lamps are connected to a multiconductor control-information line. At each input unit 10 the outputs of storage 13 are connected via a gate circuit 18 with an output $I_K$ at which there is connected the control-information line. The gate circuit 18 is controlled by an address-decoder 19 which is coupled via a terminal $A_K$ with a common input-control address line of the control apparatus.

The addresses for the control of the inputs are adjusted by means of manual switches at the control panel or front 2. At each input there is provided a connection or terminal Le for the connection of the reading or read-in line 14. The control apparatus possesses for the inputs common lines, a control-address line, a control-information line, a regulating or drive-address line, regulating or drive-information line and a reading line (FIG. 6), at which, depending upon requirements, there can be connected a number of input units, up to the maximum number for which the relevant control apparatus is designed.

Figure 3:
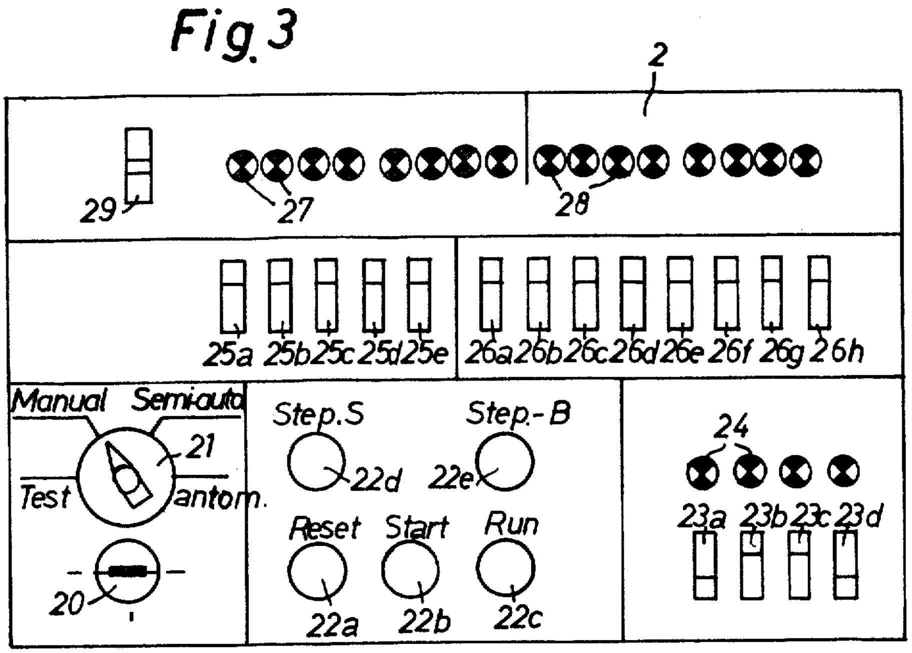
FIG. 3 schematically illustrates in front view an operating- and control panel or front for the control apparatus.

The operating- and control front or panel 2 of the control apparatus has been schematically portrayed in FIG. 3. The apparatus can be turned-on and turned-off by means of a key holder or lock 20. For the undisturbed automatic operation there is provided at the key holder 20 a third switching position in which the apparatus is turned-on and the operating keys are blocked. With the aid of a selector switch 21 it is possible to set the different operating modes.

In the switch position TEST it is possible to carry out a program test without any conditions and the outputs can be set and extinguished. In the switch position MANUAL there occurs a program test with input conditions, but the outputs are blocked. To carry out a program test with the inputs and outputs the selector switch 21 must be placed into the SEMI-AUTOMATIC position and with the switch position AUTOMATIC there is set the automatic operation of the apparatus.

At the operating panel 2 there are furthermore provided five function keys *22a*, *22b*, *22c*, and *22e*. After actuating the key *22a*, constituting the RESET key the control apparatus assumes its rest state the starting conditions are present. By means of the key *22b*, constituting the START key, the program to be started is released. The key *22c*, constituting the RUN key, switches the control apparatus into operation. By means of both of the keys *22d* and *22e*, constituting STEP keys, it is possible to index the program through one step and to switch from one program block to the next.

As will be described more fully hereinafter, by means of the four switches *23a*, *23b*, *23c* and *23d* it is possible to select a program block 9 (FIG. 1) which should be released by the start key. The five manual switches *25a*, *25b*, *25c*, *25d* and *25e* serve for setting "group-numbers," i.e. the addresses of input units and, as will be explained hereinafter, of output-units (plug-in units, cards and the like) and the eight switches *26a*, *26b*, *26c*, *26d*, *26e*, *26f*, *26g* and *26h* serve to set and extinguish the outputs. At the eight signal lamps 27 there is indicated the signal occupancy of the eight inputs E of an input card (FIG. 2) and the eight signal lamps 28 are provided for indicating the signal occupancy at the outputs. The 16 signal lamps 27, 28 also serve for the indication of command words.

The decision whether the inputs or outputs for commands are indicated is made by the switch 29 possessing the two switch positions TEST and COMMAND. If, as previously explained, the inputs E should be controlled by a predetermined input card, then at the group number switches *25a* . . . *25e* there are set the addresses of the relevant input card, whereupon the signal lamps 27 indicate the signal occupancy of the eight inputs of such input card. The switch 29 in this case of course is at the position TEST.

Figure 4:
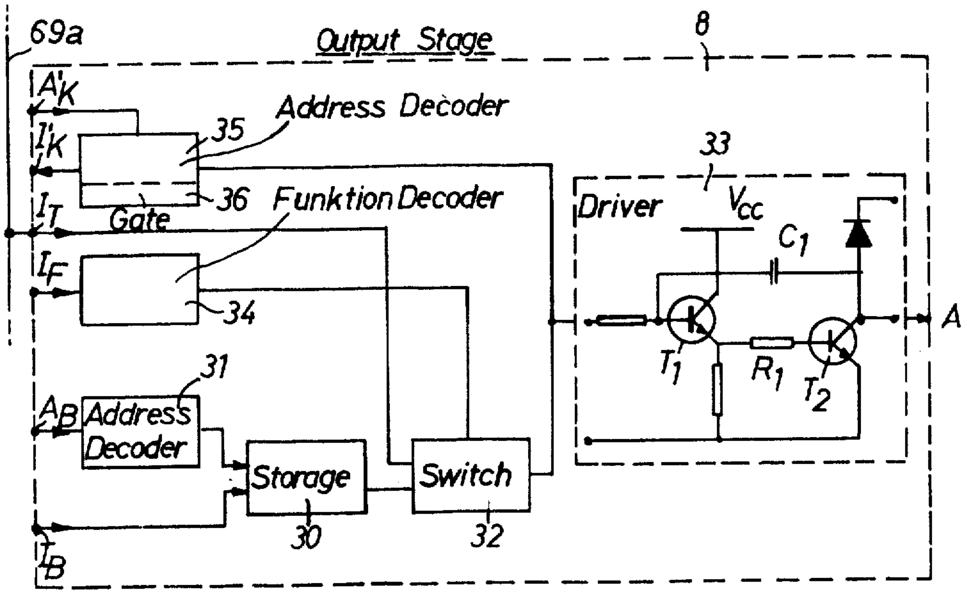
FIG. 4 is a block circuit diagram of an output stage.

FIG. 4 illustrates a block circuit diagram of an output stage 8. An addressed storage (position) 30 is connected via the terminal $I_B$ with the common output-information line (FIG. 6) and its address-decoder 31 receives through the agency of the terminal $A_B$ address signals from the common address line. If the address line carries the addresses provided for the storage 30, then the information appearing at the output information line is read into the storage 30 and remains stored therein for such length of time until it is again extinguished by corresponding different information. The storage 30 is connected at its output side via a switch 32 with a driver circuit or driver 33, at which there is connected the output A. The driver circuit 33 is designed such that the switching flank or edge does not become too steep, and thus there is ensured for a sufficient internal security against disturbances.

A preferred circuit of the driver stage 33 contains an output transistor $T_2$, the base of which is coupled via a resistor $R_1$ with the emitter of an input transistor $T_1$ and the collector of which is coupled via a capacitor $C_1$ with the base of such input transistor $T_1$. The switch 32 is set by the selector switch 21 (FIG. 3) through the agency of a function-decoder 34. In the switch positions SEMI-AUTOMATIC and AUTOMATIC the driver circuit or stage 33 is coupled with the storage 30, and in the switch positions MANUAL and TEST the driver circuit 33 is blocked for the information in the storage 30. During test operation (selector switch 21 assumes the position TEST), by means of one of the switches 26 of the operating panel or front 2 (FIG. 3) it is possible to set and extinguish the output A with test information via the switch 32 and driver circuit 33.

An output unit (push-in unit, card or the like) possesses, for instance, eight separate outputs A and contains a corresponding number of driver stages 33 as well as storage (positions 30). The address-decoder 31 is constructed similar to that of the input unit (FIG. 2), and for control purposes an output unit, just as was the case for the input unit, contains a second address-decoder 35 with a gate circuit 36, which is electrically coupled via the terminal $A_K'$ with the common control-address line of the control apparatus.

Just as was the case for the input control the addresses for the control of the outputs are set by means of the manual switches *25a* . . . *25e* of the operating panel 2 (FIG. 3). By means of the addresses of the relevant output unit the address-decoder 35 controls the gate circuit 36, and via the gate circuit 36 and the terminal $I_K'$ all of the outputs of the output unit are connected with a common control-information line, by means of which there are connected the outputs of the output unit for indicating purposes at the signal or indicator lamps 28 (FIG. 3).

Each output unit, apart from the already mentioned connections or terminals, is provided with the terminal $A_K'$ for connection of the output unit with the common control-address line, the terminal $I_K$ for connection with the common control-information line, the terminal $A_B$ and the terminal $I_B$ for the connection of the unit with the common address line and the common output-information line respectively, further the terminal $I_T$, by means of which the unit can be connected with the multiconductor common test-information line *69a* leading to the switches *26a* . . . *26h* of the operating- and control front or panel 2 (FIG. 3), as well as the terminal $I_F$ for the connection with a common "function"-line which delivers the signals characterizing the operating mode to a driving logic controlled by the selector switch 21. With the exemplary embodiment under discussion, depending upon requirements, it is possible to connect with such common lines up to a total of 32 output units, each having eight respective outputs.

Figure 5:
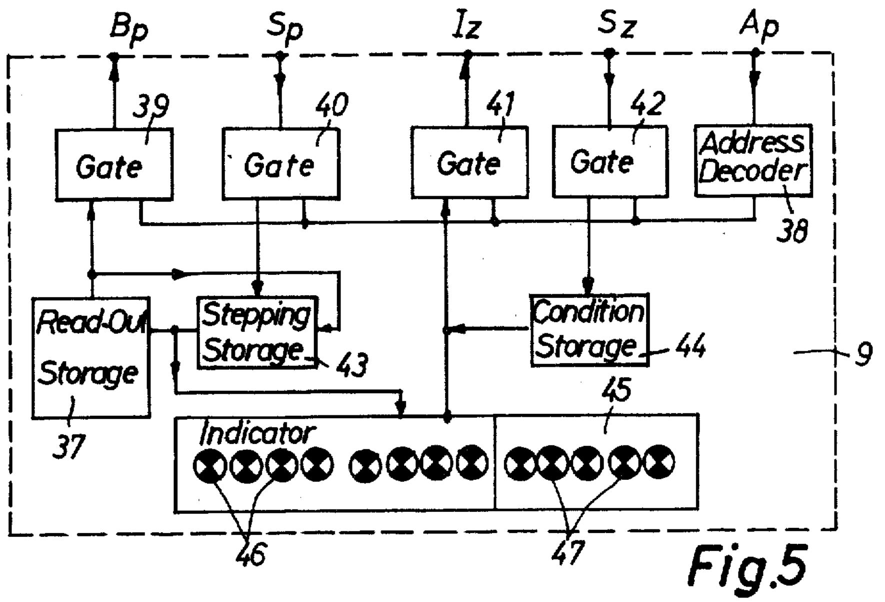
FIG. 5 is a block circuit diagram of a program block.

A preferred embodiment of program block 9 (FIG. 1) has been illustrated in the block circuit diagram of FIG. 5. The most important part or component of the program block 9 is read-out storage for preserved storage operations. A known storage of this type is designed with MOS-technology and can be electrically programed. With such conventional read-out storage it is possible to store at 256 storage positions or places 6-bit-words. Additionally, the information can be extinguished with UV-light. Two such storages are connected in parallel for the read-out storage 37, so that this storage 37 can accommodate command words or messages of 16 bit length. The program block 9 contains an address-decoder 38 which is connected via a connection or terminal $A_P$ at a common "block"- address line with a number of conductors and controls or drives a number of gate circuits 39 . . . 42, as soon as the block-address line carries the addresses provided for the program block.

Figure 6:
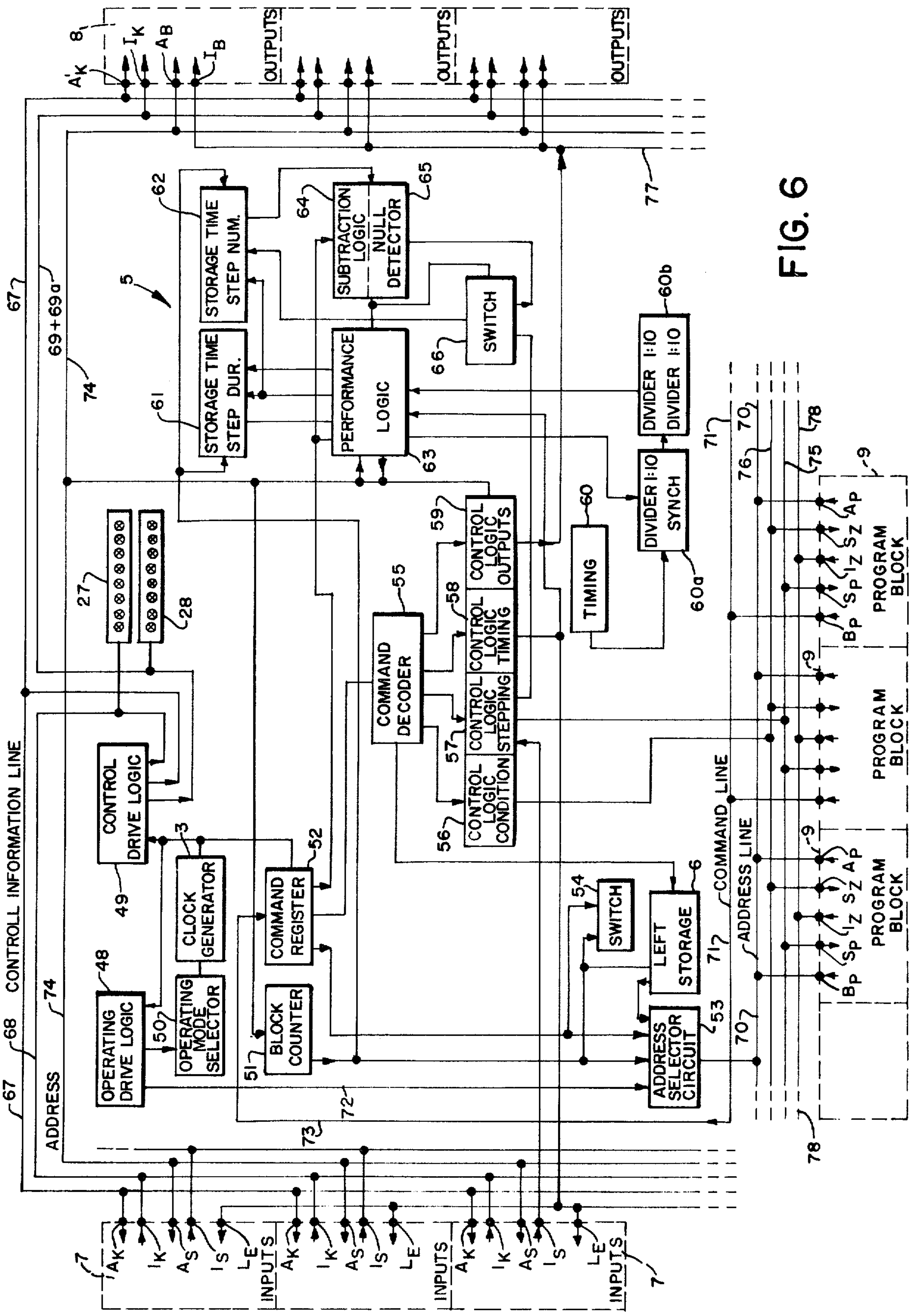
FIG. 6 is a block circuit diagram of the central station or device of the control apparatus according to FIG. 1 with blocks depicting the timing circuits, in which there have been shown only the most important connections.

The gate circuit 39 connects the read-out storage 37 via a connection or terminal $B_P$ with a multiconductor "command"-line (FIG. 6). The signals for the storage position-addresses are delivered by stepping or indexing storage 43 (counter) which can count to 256. The stepping storage 43 is set by a stepping-control signal which is delivered thereto via the gate circuit 40 through the agency of the terminal $S_P$ from a common stepping control-signal line. Additionally, the stepping or indexing storage 43 can be adjusted and blocked by signals received from the command words or messages of the read-out storage 37. Furthermore, the program block 9 contains a "condition"-storage 44 at which, for instance, there can be stored at five storage positions information concerning the operating conditions of the control apparatus. Such operating condition-information can deliver data or information, for instance, whether a program is active or not, whether a subroutine, a first time unit, a second time unit is active or not, or whether an alarm bit has been set.

The condition storage 44 receives the condition information or intelligence from a condition control-signal line via the gate circuit 42 and the connection or terminal $S_Z$ and delivers such via the gate circuit 41 and the connection $I_Z$ to a collector line. At the output of the stepping storage 43 and the condition storage 44 there is connected an indicator device 45 with eight signal lamps 46 arranged at the front side of a plug-in unit for the indication of the stepping or indexing numbers (storage positions) and five signal lamps 47 for the indication of the five bits of the previously discussed condition storage 44. As already explained, with the here described constructional embodiment of control apparatus, there can be connected to the common lines a total of 16 such program blocks, that is to say, the program portion of the control apparatus possesses a maximum storage capacity of 4096 command words or messages, each with 16 bits.

Now in FIG. 6 there has been shown in block circuit diagram details of the central unit or station 1 (FIG. 1). The central unit 1 contains an operating-drive logic 48 with a circuit arrangement for the operation mode selector 50 and a control drive logic 49, the manually operable switches and keys of which as well as the signal lamps are arranged at the operating- and control panel of the control apparatus. The control address line 67 for the five-bit control-address words leads from the control drive logic 49, at which line 67 there are connected the inputs or input units 7 via the connections or terminals $A_K$ and the outputs or output units 8 by means of the connections or terminals $A_K'$. Furthermore, leading from the control drive logic 49 for the inputs 7 is the control information line 68, with which there are connected the input units 7 with their terminals $I_K$, and for the outputs 8 the control information line 69 with the necessary line conductors at which there are connected the output units 8 with the corresponding terminals, which in FIG. 6 are grouped together into a respective connection of terminal $I''_K$.

As already previously explained, the clock generator 3 generates in successive periods eight respective time-shifted or time-displaced control pulses which do not overlap or intersect one another. The first control pulse of each period switches by one step a counter 51 which in a dual or binary system cyclically counts from 0 to 16. The counter constitutes the address for a program block 9. The program block-address counter, hereinafter conveniently briefly referred to as block counter 51, is coupled via a block address-selector circuit 53 with the block address line 70, at which there are connected the program blocks 9 with the connections or terminals $A_P$. The second control pulse of each period constitutes a reading signal for a command register 52, with which there is connected the common command line 71 of the program blocks 9 (terminals $B_P$).

As already also previously explained, a program block 9 can be selected via its address by means of the manual switches 23*a* . . . 23*d* of the operating- and control panel 2 (FIG. 3) and by actuating the STEP key 22*e* it is possible to switch from one program block to the next, i.e. to always further switch by one the block counter 51. In FIG. 6 this is indicated by a connection or line 72 leading from the operating drive logic 48 to the block address-selector circuit 53 and by the connection of the operating mode-selector circuit 50 with the clock generator 3.

A program block 9 also can be selected by means of a command. Since for the program block address in this case there are required four bits, four stages of the command register 52 are likewise coupled with the selector circuit 53 and can be connected via such with the block address line 70. In order to be able to use a partial program (program block) as a subroutine, and as already previously mentioned, the central unit contains an anti-clockwise storage 6, which is constituted by a storage having random access. If a subroutine should be started, then there is stored at the storage position of the anti-clockwise storage 6 the address of a program block from which there originates the start command. For writing-in, the address comes from the command, and for reading the anti-clockwise address, the address comes from the block counter 51. The anti-clockwise storage 6 is therefore connected via a switch 54 both with the command register 52 and also with the block counter 51.

At the command register 52 there is connected the control mechanism 4 (FIG. 1) of the control apparatus. The control mechanism 4 contains a command decoder 55 at which there are connected the anti-clockwise storage 6 as well as the control logic arrangement 56 . . . 59. The entire control logic encompasses four sections. A control logic 57 for the stepping storage 43 of the program blocks 9 (FIG. 5), which for the reception of the input-control information is connected with the input- (control)-information line 73 at which there are connected the input units 10 by means of the terminals $I_S$, and for the delivery of stepping signals to the stepping storage 43 is connected with the stepping-control signal line 75, at which there are connected the program blocks 9 by means of the connections or terminals $S_P$.

The control logic 57 is furthermore also connected with the timing or timer circuits 5. The control logic 56 for the condition storage 44 of the program blocks 9 delivers binary signals characterizing the condition state to the condition control signal line 76 at which there are connected the program blocks 9 by means of the connections or terminals $S_Z$. The control logic 59 for the outputs or output units 8 delivers the switching-on and switching-off command signals to the output- (control)-information line 77, at which there are connected the output units 8 via the connections or terminals $I_B$. The control logic 58 controls the timing circuits 5. The entire control logic arrangement 56 . . . 59 is controlled by the clock generator 3 by means of the six clock signals which are still available during each period, and both of the last clock signals of each period are controlled via the control logic 58 for the timing circuits 5.

The timing circuits 5 are constructed on a digital basis. From a number characterizing a desired time-span as a multiple of a selected time unit one is subtracted for each respective time unit. When reaching the result null the time-span has run-out. A separate timing clock generator 60 is provided for the timing circuits, this timing clock generator 60 generating a 100 Hz timing clock signal. Connected with the timing clock generator 60 is a synchronization circuit **60*a* containing a 1:10-divider stage and equipped with a run-off logic, which is controlled by clock signals of the clock generator 3 from the performance logic 63 of the timing circuit, and delivers the 10 Hz (0.1 sec.)-timing signal synchronized with the clock signal to a timing signal transmitter 60*b*** containing two further 1:10-divider stages, at the outputs of which there are present timing signals for the time unit 0.1 sec., 1.0 sec., and 10 sec. A predetermined time-span is determined by the duration of a timing step (timing unit), in this case 0.1 second or 1.0 second or 10 seconds, and the number of such unit-time steps.

The information for the time step-number- and time step-duration are contained in the command signals. For the determination of the time step-duration there are required in this case two bits of a command. If eight bits are available for the time step-number, then there can be determined by the timing circuit time-spans of 0–25 seconds, 0–256 seconds and 0–2560 seconds. The information regarding the time step-duration is read-in via the performance logic 63 into a storage 61 for "time step-duration." By means of the information signals of storage 61 there is determined at the performance logic 63 which of the three time unit signals for 0.1 second, 1.0 second and 10 seconds of the time signal generator **60*b* is effective during the subtraction. The information regarding the time step-number is read-in via a switch 66 into a storage 62** for "time step-number."

Connected after the storage 62 for the time step-number is a subtraction logic 64 and a null detector 65. As long as a set or adjusted time-span has not run out the null detector 65 delivers, for instance, a logical binary signal 1. This binary signal 1 of the null detector 65 is representative of the fact that at the moment a timing circuit is active. The information concerning the activity of the timing circuit —active being represented by the binary signal 1, non-active being represented by the binary signal 0—, is stored at the condition storage 44 (FIG. 5). Now for each program block 9 there are provided two pairs of storages 61 and 62, so that for each partial program there can be programed 2 times, sometimes which is generally sufficient.

The storage pairs 61, 62 are addressed with the program address of the program block 9 associated therewith in each case. Since in each instance two pairs of storages 61, 62 have the same program address, the one storage pair is controlled by the seventh clock signal and the other storage pair by the eighth clock signal of the clock signal period, i.e. the seventh clock signal $P_6$ controls the "timing circuit I" and the eighth clock signal $P_7$ the "timing circuit II", provided that the timing circuits are not blocked by an earlier clock signal, for instance the clock signal $P_2$. In order to reduce the storage content of the read-in storages 62 for time step-numbers in each case by one unit, the program is blocked for a complete cycle. Blocking of the program occurs by means of a blocking signal derived from the performance logic 63 of the timing circuit and effective via the clock generator 3 for the control logic 55 . . . 59. During this blocking time all of the timing storages are brought to the new state.

The reading-in of the input information into the storage 13 of the input units 10 (FIG. 2) as well as the storage 61 for the time step-duration and the storage 62 for the time step-number occurs by reading signals delivered by the control logic 58 for the timing circuits. The further construction of the central unit, the nature and number of the logic modules or units required therefore and there interconnection into the circuit configuration as well as the (time) control of the individual circuits by the control signals to be generated by the clock generator 3, which so to speak is the heart of the control apparatus, is for the most part determined by the set of commands which is provided.

The command words or messages stored in the read-out storages 37 of the program blocks have a uniform length of 16 bits. For the command words there are provided for each of the operational portion and the address portion eight bits, with the first four bits of the operational portion there are characterized basic commands and with the other four bits of the operational portion there are characterized additional or supplementary conditions. A command set therefore encompasses a maximum of only 16 basic commands which can be amplified by additional or supplementary conditions.

Figure 7:
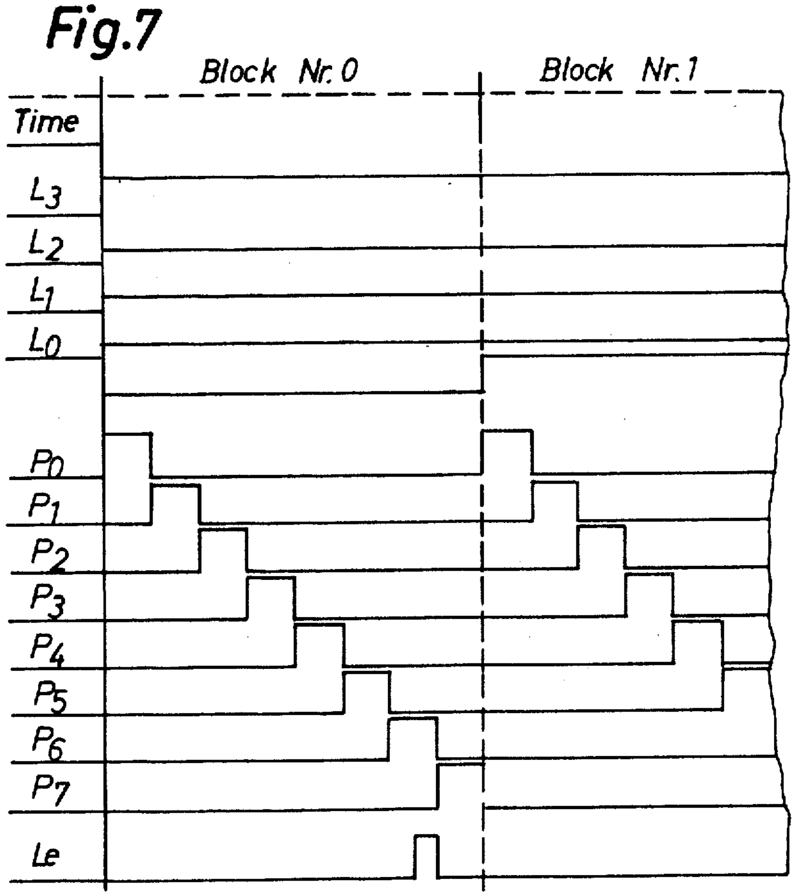
FIG. 7 graphically illustrates different signal curves or shapes.

In the description to follow there will be given as an example a command set of fourteen basic commands and there will be explained the function of the control apparatus on the basis of the individual commands, wherein reference will be made to FIG. 7, in which there have been plotted block address signals and command signals, as well as to the following table in which there is apparent the processing of the commands as a function of time by the clock signals of a period for the individual basic commands.

| | Commands | Clock Signals of A Period | | | | | | | |
|---|---|---|---|---|---|---|---|---|---|
| | | $P_0$ | $P_1$ | $P_2$ | $P_3$ | $P_4$ | $P_5$ | $P_6$ | $P_7$ |
| 1 | NOP no function | | | | | Stepping counter + 1 | | | |
| 2 | PRS Program Stop | | | Set Stop-Bit | | | | | |
| 3 | SPR Start Program | | | (Set Wait Bit) | Extinguish Stop-Bit | Stepping counter + 1 | | | |

–Continued

| No. | Commands | | $P_0$ | $P_1$ | $P_2$ | $P_3$ | $P_4$ | $P_5$ | $P_6$ | $P_7$ |
|---|---|---|---|---|---|---|---|---|---|---|
| | | | | | | Clock Signals of A Period | | | | |
| 4 | SPG | Jump | | | | | Load stepping storage | | | |
| 5 | ZSW | Two steps with correct input | | | | | Stepping counter + 1 | Stepping counter (+ 1) | | |
| 6 | WBE | Wait for Input | | | | | Stepping counter (+ 1) | | | |
| 7 | SAG | Set Output | | | Set Output 0 or 1 | | Stepping counter + 1 | | | |
| 8 | WZT | Wait Time | | | Start time circuit | Control time circuit | Stepping counter (+ 1) | | | |
| 9 | SZT | Start Time | | | Start time circuit | | Stepping counter + 1 | | | |
| 10 | SZA | Two steps for expected Time | | | | | Stepping counter + 1 | Stepping counter (+ 1) | | |
| 11 | EUP | End of subroutine | | | Set Stop-Bit | Erase writing bit | | | | |
| 12 | SAL | Set Alarm | | | Set alarm-bit | Erase alarm-bit | Stepping counter + 1 | | | |
| 13 | SWP | Condition of a Program | | | | | Stepping counter + 1 | Stepping counter (+ 1) | | |
| 14 | ZTL | Extinguish Time | | | Time storage at null | | Stepping counter + 1 | | | |

The clock generator for each period delivers eight successive clock signals. As already explained with the first clock signal $P_0$ of each period the block counter 51 (FIG. 6) is indexed by one unit or step. The block counter 51 delivers to a four-conductor address line 30 the address signals $L_0 \ldots L_3$ (FIG. 7) for the program blocks 9. The address signals are effective during the entire period. The second clock signal $P_1$ of each period is a read-in signal for the command register 52 and with the next to last and last clock signals $P_6$, $P_7$ of each period there are controlled both of the timing circuits. With the four intermediate clock signals $P_2 \ldots P_5$ there is undertaken the commanddependent control of the control apparatus. After the second clock signal there is available for the period the actual command word of the program block which is then active at the command register 52. The momentarily not required bit of a command word can be the logical signal 0 or the logical signal 1, they are passed over and are designated hereinafter by the symbol X.

| | | |
|---|---|---|
| Command No. 1 | no function "NOP" | 0000 XX XX XXXX XXXX |
| | This command only brings about that the stepping counter 43 increases the addressed program block (FIG. 5) by one. Any other operation is suppressed. This indexing of the program stepping counter 43 is brought about by the fifth clock signal $P_4$ of the period, which so-to-speak flows through, by means of the control logic for the stepping storage (FIG. 6) to the stepping-control signal line 75 and then further via the terminal $S_p$ and via the gate circuit 50 (FIG. 5), to the stepping storage 43. | |
| Command No. 2 | Program stop "PRS" | 0001 XX XX XXXX XXXX |
| | With this command there is stopped a partial program (program block). The stepping counter 43 is blocked by a stop bit. Setting of the stop bit occurs with the third clock signal $P_2$ of the period, i.e. with the first command-dependent clock signal, so that the clock signal $P_4$ of the period which switches the stepping counter is already ineffectual. The stop bit only can be extinguished by a command, which only can come from another program block, or by a manual switch. This partial program is therefore first again operated if it is again started manually or by another partial program. The stop bit is set at the condition storage 44 of the program block (FIG. 5) by means of the control logic 56 for the condition storage (FIG. 6). | |

–Continued

| | | |
|---|---|---|
| Command No. 3 | Start program "SPR" | |
| | For this command there are provided supplementary or auxiliary conditions characterized by the fifth and sixth bit of a command word or message. | |
| No. 3a | Start program | 0010 00 XX XXXX AAAA |
| | The symbol AAAA constitutes a program block address. The program block addressed by the symbol AAAA is started, its stepping counter is set to null and at its condition storage the stop bit is extinguished by the clock signal $P_3$. By means of the clock signal $P_4$ the stepping counter of the program block, from which this command is derived, is increased by one. | |
| No. 3b | Start subroutine | 0010 01 XX XXXX AAAA |
| | The program addressed by the symbol AAAA, as previously explained, is started, so that it is effective as a subroutine, additionally the address of the program block from which this command comes is recorded or written into the anti-clockwise storage 6 and at its condition storage there is set a waiting bit by the clock signal $P_2$. | |
| Command No. 4 | Jump "SPG" | 0011 XX XX BBBB BBBB |
| | This jump is without condition. The step number BBBB BBBB is recorded or written, during a clock signal $P_4$, into the stepping counter of said program block. It is therefore possible to jump at any random command word address at the partial program. | |
| Command No. 5 | Two steps, when a predetermined input has a predetermined signal ("ZSW"). The predetermined signal, which can be the logical signal "0" or "1" is characterized by the supplementary or auxiliary condition. | |
| No. 5a | Two steps, when the input O has | 0100 01 XX CCCC CCCC |
| | The stepping counter of the program block is increased by two units when the input addressed with CCCC CCCC carries the logic signal 0, otherwise the stepping counter is increased by one. | |
| No. 5b | Two steps, when the input 1 has | 0100 10 XX CCCC CCCC |
| | The stepping counter of the program block is increased by two units when the input addressed with CCCC CCCC carries the logic signal 1, otherwise the stepping counter is increased by one. The further counting by one occurs at two units as a function of signals of the addressed input by the clock signal $P_5$. | |
| Command No. 6 | Wait until the desired input signal 0 or 1 is present ("WBE"). | |
| No. 6a | Wait for the input 0 | 0101 01 XX CCCC CCCC |
| | Wait for the input 1 | 0101 10 XX CCCC CCCC |
| | The symbol CCCC CCCC constitutes the address for the input. The stepping counter of the program block is further indexed by one by the clock signal $P_4$ only as a function of the auxiliary or supplementary condition. If the addressed input does not fulfill the condition then the signal for further indexing the stepping counter is blocked. | |
| Command No. 7 | Set output "SAG" | |
| No. 7a | Set output to 0 | 0110 01 XX DDDD DDDD |
| No. 7b | Set output to 1 | 0110 10 XX DDDD DDDD |
| | The output addressed by the symbol DDDD DDDD is set to 0 or 1. The address line 74 (FIG. 6) carries the address DDDD DDDD, by means of which the output is activated. By means of the clock signal $P_2$ there is controlled via the control logic 59 for the outputs, the output information line 77 and the terminal $I_8$ the driver circuit 33 (FIG. 4) for 0 or 1. The clock signal $P_4$ again brings about further indexing of the stepping counter by one step or unit at the relevant program block. | |
| Command No. 8 | Wait a certain time ("WZT") | 0111 SS TT ZZZZ ZZZZ |
| | With this command all four bits are required for the supplementary or auxiliary conditions. With the first two bits SS of the auxiliary conditions there are determined the time step-duration, wherein for instance the following signals designate:<br>SS = 01 the time unit 0.1 second,<br>SS = 10 the time unit 1.0 second, and<br>SS = 11 the time unit 10 seconds.<br>With both of the other bits TT of the auxiliary conditions there are designated both of the timing circuits I and II, i.e. for the momentary program addresses both of the pairs of storages 61 and 62:<br>TT = 01 for the timing circuit I<br>TT = 10 for the timing circuit II.<br>The eight address bits ZZZZ ZZZZ state for how | |

–Continued

| | |
|---|---|
| | many timing steps there must be waited. The waiting time therefore can amount to 0.1 second to 2,560 seconds. With the clock signal $P_2$ there is started the timing circuit I or II which has been selected by the command. The stepping storage of relevant program block is blocked (clock signal $P_3$, null detector 65) and when the waiting time which has been commanded has expired, then in the corresponding period the program block is increased by one unit by means of the clock signal $P_4$ of the stepping counter 43. |
| Command No. 9 | Starting time "SZT" 1000 SS TT ZZZZ ZZZZ |
| | Just as for Command No. 8 both of the bits SS of the auxiliary conditions relate to the time unit 0.1 second, 1.0 second and 10 seconds and both of the bits TT relate to the timing circuit I and timing circuit II. The address bits ZZZZ ZZZZ designate the number of timing steps. If such a command is actual, then at the relevant clock signal period there is started the timing circuit I or II indicated by the command by means of the clock signal $P_2$, and the clock signal $P_4$ brings about a further indexing by one of the stepping counters 43 of the relevant program block. |
| Command No. 10 | Two steps, when "SZA" 1001 SS TT XXXX XXXX |
| | the started time, depending upon the conditions, has run-out or not.<br>Both of the bits TT of the auxiliary conditions again relate to the timing circuits I and II, for instance:<br>TT = 01 timing circuit I<br>TT = 10 timing circuit II.<br>The bits SS of the auxiliary conditions indicate when the stepping counter 43 of the program block has been increased such that:<br>SS = 01 when the time has run-out,<br>SS = 10 when the relevant timing circuit I or II is still active, i.e. the time still runs.<br>If these conditions are not present, i.e. if for SS = 01 the time has not run-out or for SS = 10 the time has already run-out, then the stepping counter of the program block is only increased by one unit. This increase by one is again brought about by the clock signal $P_4$ of the clock signal period. The renewed increase by one for the relevant conditions takes place by the clock signal $P_5$, which thereafter becomes ineffectual, when for SS = 01 the null detector delivers a logical signal "1" and for SS = 10 the null detector delivers a logical signal "0". |
| Command No. 11 | End of subroutine "EUP" 1010 XX XX XXXX XXXX |
| | (end of sub-program)<br>With this command the program of a program block, from which there comes the command, is stopped; the clock signal $P_2$ brings about that at the relevant condition storage 44 there is set a stop bit. At the anti-clockwise storage 6 there is present a program block address and the condition storage of such program block contains a waiting bit. With the command the waiting bit is extinguished at such condition storage via the clock signal $P_3$. |
| Command No. 12 | Alarm bit " |
| No. 12a | Set alarm bit "SAL" 1011 01 XX XXXX XXXX |
| No. 12b | Extinguish or erase alarm bit "LAL" 1011 10 XX XXXX XXXX |
| | At a storage position of the condition storage 44 the alarm bit is set and the alarm bit present at the storage position is extinguished respectively. The setting of the alarm bit occurs by means of the clock signal $P_2$ and the clock signal $P_3$ extinguishes an existing alarm bit. In both instances, by means of the clock signal $P_4$ the stepping counter of the relevant program block is further indexed by one. |
| Command No. 13 | Condition of a certain program ("SWP") |
| | With both of the first bits of the auxiliary condition there is characterized the condition of a program, active or stopped. |
| No. 13a | The stepping counter 1100 01 XX XXXX AAAA |
| | of the program block, from which there arrives the command, is increased by two units, when the partial program addressed by the symbol AAAA is stopped. |
| No. 13b | The stepping counter 1100 10 XX XXXX AAAA |
| | of a program block, from which there comes the command, is increased by two units, when the partial program addressed by the symbol AAAA runs.<br>If these conditions are not present then the stepping counter is increased by one. The increase of the stepping counter by one is brought about by the clock signal $P_4$. The further increase by one is brought about by the clock signal $P_5$, which |

– Continued

| | | |
|---|---|---|
| | is accordingly ineffectual when the conditions are not relevant. | |
| Command No. 14 | Time extinguishing "ZTL" | 1101 XX TT XXXX XXXX |
| | With the program address of a program block, from which comes this command, there are also addressed the therewith associated timing circuits I and II (both of the pairs of storages 61, 62). Both of the TT-bits in the command determine in which of both timing circuits the time is to be extinguished. TT = 01 timing circuit I TT = 10 timing circuit II. With the clock signal $P_2$ there are set to null the storages 61, 62 determined by the auxiliary or supplementary condition. The clock signal $P_4$ brings about an increase of the stepping counter by one at the relevant program block. | |

Of the possible commands there are used in this case only 14. Both of the commands which are not used are treated like Command No. 1 (no function). It has been found that with such command set it is possible to take into account most of the functions which as a practical matter arise at controls. The setting up of a flow diagram is extremely simple and occurs in accordance with known and conventional procedures and directives. After setting up the system the commands are encoded in accordance with a binary number code and the enciphered commands are stored at the read-out storages of the program blocks. The encoding and storage advantageously occurs with the help of a charging device into which there is assembled a mini-computer.

Instead of the previously discussed command set it would be also possible to provide other commands. The relevant encoding of the command words or messages and the functions determined by the individual commands are determined by the logical coupling operations which occur at the control apparatus and therefore its construction. With respect to the construction and a command set optimization can be carried out according to conventional techniques.

While there is shown and described present preferred embodiments of the invention, it is to be distinctly understood that the invention is not limited thereto, but may be otherwise variously embodied and practiced within the spirit and scope of the invention.

What is claimed is:

1. A programmable control apparatus for controlling switching devices according to a number of flow diagrams which are interdependent and/or independent of one another, comprising, in combination, a plurality of addressed input stages for the reception of binary input information signals characteristic of the conditions of the switching devices connected therewith; a plurality of addressed output stages with connections for the switching devices for delivering output-information signals characteristic of switching commands; a central unit with which there are connected, via a common address line, said input stages and said output stages; a plurality of addressed program blocks, each having a respective read-out storage for the preserved storage at addressed storage positions of coded command and address information characteristics of the individual steps of a flow diagram, and a respective stepping storage which delivers the address signals for the storage positions of said read-out storage; a common program address line, a common command line and a common stepping-control signal line, said lines interconnecting said program blocks; said central unit containing: a clock generator generating in successive periods a respective predetermined number of time-displaced clock signals which do not overlap one another; a cyclically through-counting program address counter with which there is connected said program address line, a command register with which there is connected said command line, a control logic for the evaluation of decoded command signals, a command decoding circuit for connecting said control logic with said command register, said input stages being connected with said control logic by means of a common input information line, and said output stages by means of a common output information line; and an address storage with random access for the command-dependent storage of program block addresses; each of said program blocks being provided with at least one timing circuit, wherein during each period of the clock signals by means of a first clock signal said program address counter is indexed by one step, by means of a second clock signal said command register is read in, by means of at least one last clock signal according to the momentary program block address there is controlled at least one of said timing circuits provided for the relevant program block, and by means of the remaining clock signals there is controlled said control logic as a function of the read-in command signal, so that during each counting cycle of said program address counter all of said program blocks are sampled, and during each period there is carried out a command.

2. The control apparatus as defined in claim 1, wherein said central unit includes an internal operating-driving logic and an internal control-driving logic, an external operating and control panel equipped with manual switches and control signal lamps for said operating-driving logic and said control-driving logic, said switches including a switch for triggering a resetting signal by means of which said clock generator is blocked through the agency of said operating-driving logic and said program address counter, said command register, said address storage, said timing circuit and said stepping storages of said program blocks are set to null; said manual switches including an operation-mode selector switch for setting different operational modes of the control apparatus; said operation-mode selector switch in one of its switch positions for automatic operation actively switching said clock generator via said operating-driving logic by means of a running signal which can be manually triggered by another switch to the program course for said central unit; and said operation-mode selector switch in its switch position for test operation for the control of commands stored at said program blocks connects said command line via said control-driving logic with said signal lamps, and via said operating-driving logic said program address counter is further indexed by one step by means of a program-address switching signal triggered by still another switch, and by means of command-address switching signal triggered by yet another switch, said stepping storage of said program block designated by the program address is indexed by one step.

3. The control apparatus as defined in claim 2, further comprising a controlled selector circuit connecting said program address line for the infeed of program block-address signals with said program address counter for the command-independent addressing of said program blocks by address signals of said program address counter, with said command register for the command-dependent addressing of said program blocks by command signals, and for the selective addressing of said program blocks with a transmitter circuit of said operating-driving logic; said manual switches including manual switch means for the output of address signals for activating said transmitter circuit, and signal lamps for indicating the addresses selected by said manual switch means.

4. The control apparatus as defined in claim 3, wherein for a semi-automatic operation in a further switch position of said operation-mode selector switch, said program address counter is blocked via said operating-driving logic, said manual switch means for addressing a selected program block, said manual switches further including a switch for triggering a start signal for the selected program block for starting the automatic running of a program.

5. The control apparatus as defined in claim 3, wherein, for the use of a program stored in one of said program blocks as a subroutine, said program address line is connected via said controlled selector circuit with said address storage, and the latter is connected with said command register via a switch element for reading in of an address, and with said program address counter for reading out the address.

6. The control apparatus as defined in claim 2, wherein a number of said input stages are grouped together into at least one input unit which includes a storage with a respective storage position for each input of said input unit, said storage being connected with said inputs via a respective low-pass filter and a respective contact transducer, said storage for reading in input information signals appearing at said inputs is connected via a reading line with said central unit and via selector circuits and a gate circuit with said common input information line, said gate circuit being controlled by said common address line connected with an address decoder circuit and which address line receives address signals for said command register, wherein the input addresses encompass a respective first address portion for addressing said input units via said address decoder circuit, and a second address portion for addressing the individual inputs of said input units via said selector circuits.

7. The control apparatus as defined in claim 6, wherein each of said input units includes a further gate circuit for control purposes, by means of which the positions of said storage are connected with a multiconductor control input-information line, and said further gate circuit is controlled by a control-address decoder circuit coupled via a common control-address line with said control-driving logic, wherein the latter, for the selective occupancy of said control address line with control address signals, includes an address transmitter circuit which can be operated by address manual switch means of said manual switches, and further includes switching means by means of which said control input-information line for the indication of the input information appearing at said inputs of the input unit, which is selected by a control address, is connected with at least some of said signal lamps.

8. The control apparatus as defined in claim 7, wherein a number of said output stages are assembled together into an output unit containing a storage with a respective storage position for each output of said output unit, said storage for the reading-in of command signals being connected via an address decoding circuit with said common address line and said common output information line, and for the occupancy of said outputs of the output unit with switching signals, corresponding to the command signals, said storage is coupled via a switch element and a respective driver stage with controlled switching flanks with said outputs of the output unit, said switch element being controlled by function signals of said operating-driving logic via a function decoding circuit, so that for a switch position of said operation-mode selector switch for automatic and semi-automatic operation there is established a connection of said storage with said outputs of the output unit, and with a switch position of said operation-mode selector switch for test operation said connection is interrupted.

9. The control apparatus as defined in claim 8, wherein for control purposes each of said output unit has the outputs thereof connected via a control-address decoder circuit with said common control-address line, and via a gate circuit controlled by said address-decoder circuit with a common multi-conductor control-output information line, wherein said control-output information line is connected via switching means at signal lamps for the indication of the output information which appears at said outputs of the output unit selected by the control address.

10. The control apparatus as defined in claim 9, wherein said control-driving logic for an output test contains test-output signal generator means which can be operated by test-manual switch means, a multiconductor test-output information line connected with said test-output signal generator means, and for each output unit said inputs of the driver stages are connected via said switch element with said test-output information line when said operation-mode selector switch is in its test operation position, so that during test operation by means of said test-manual switch means said outputs of the output unit selected by a control address can be extinguished and set.

11. The control apparatus as defined in claim 10, wherein for the switch position of said operation-mode selector switch corresponding to test operation said outputs are connected via said switch element with said test-output information line and the input information signals fed to said control logic via said input information line are blocked by a function signal which is delivered in this test switch position of said operation-mode selector switch from said operating-driving logic, so that the program test can be performed without taking into account the input conditions, and that additionally a program test with input conditions is provided wherein in a further switch position of said operation-mode selector switch for manual operation, similar to the test operation, said program address counters and said stepping storages of said program blocks can be stepwise indexed by actuation of given switches of said manual switches, but by means of a function signal of said operation-driving logic there is eliminated the blocking of the input signals, and the outputs are blocked via the associated switch element.

12. The control apparatus as defined in claim 1, further including a digital time determination provided for each of said timing circuits in which a time-span is determined by a number of timing steps of uniform duration and by downward counting of the number of timing steps to null, and each timing circuit of said program blocks contains a timing-step number storage which can be addressed with its address for receiving binary coded information for the number of timing steps, a common performance logic for said timing step number storage, a subtraction logic with a null detector and a circuit arrangement for generating a timing step signal of uniform timing step duration, the timing step signal of said circuit arrangement being synchronized with the first clock signal of the clock signal period of said clock generator, said performance logic delivering a blocking signal to said clock generator, by means of which the program is blocked for a full cycle and during which cycle, by means of said subtraction logic, said timing-step number storage, which contains timing step number information, is adjusted to the momentarily prevailing newest state, and said null detector, with a storage content which does not equal null, delivers a logical signal 1, and with a storage content which equals null delivers a logical signal 0, by means of which there is blocked the subtraction operation for the relevant timing-step number storage.

13. The control apparatus as defined in claim 12, wherein said circuit arrangement for generating timing step signals contains a timing unit for generating a network synchronized timing clock signal, a first 1:10 divider circuit with a synchronization circuit controlled by said performance logic, and a second divider circuit for two further 1:10 scaling operations, said circuit arrangement thus delivering timing step signals for three different timing step durations, and said timing circuit for each program block contains a storage unit for receiving binary coded information concerning the momentarily valid timing step duration, wherein by means of the stored timing step duration information, there is determined via said performance logic, which of the three timing step signals is effective at said subtraction logic.

14. The control apparatus as defined in claim 13, wherein said timing circuit for each program block contains a first pair of timing storages, encompassing a time step duration storage and a time step number storage, and a second pair of timing storages, both pairs of timing storages being addressed with the address of an associated one of said program blocks and being distinguished at said performance logic by characteristic information contained in the commands, and said performance logic for said first pair of timing storages is controlled by the next to last clock signal of the clock signal period, and for said second pair of timing storages it is controlled by the last clock signal.

15. The control apparatus as defined in claim 14, wherein said program blocks contain a respective condition storage having storage positions at which there can be stored information characterized by binary signals and indicating whether the program of the relevant one of said program blocks is active or not active, whether a subroutine is active or not active, whether said first or said second pair of timing storages is active or not active, and whether an alarm bit has been set or not set, and said condition storage of the associated one of said program blocks is occupied with signals via a common conditioncontrol signal line and a respective gate circuit from a control portion of said control logic, and condition signals of said condition storage are effective at said central unit via a further gate circuit of each program block and a common condition signal line.

16. The control apparatus as defined in claim 15, wherein each program block contains at its front face signal lamps at which there are indicated the step number of said stepping storage and the signal occupancy of said condition storage.

* * * * *